United States Patent [19]
Eschbach et al.

[11] Patent Number: 5,450,217
[45] Date of Patent: Sep. 12, 1995

[54] IMAGE-DEPENDENT COLOR SATURATION CORRECTION IN A NATURAL SCENE PICTORIAL IMAGE

[75] Inventors: Reiner Eschbach, Webster, N.Y.; Bernd W. Kolpatzik, Watertown, Mass.

[73] Assignee: Xerox Corporation, Stamford, Conn.

[21] Appl. No.: 247,367

[22] Filed: May 23, 1994

[51] Int. Cl.$^6$ ............................................ H04N 1/60
[52] U.S. Cl. .................................... 358/518; 358/520
[58] Field of Search ............... 358/520, 518, 521, 519, 358/523; 348/453, 649, 650, 675

[56] References Cited

U.S. PATENT DOCUMENTS

| | | | |
|---|---|---|---|
| 4,831,434 | 5/1989 | Fuchsberger | 358/520 |
| 5,144,420 | 9/1992 | Omuro | 358/518 |
| 5,204,948 | 4/1993 | Kato | 358/520 |
| 5,220,620 | 6/1993 | Nakano et al. | 358/520 |

OTHER PUBLICATIONS

A. Inoue et al.; "Adaptive Quality Improvement Method for Color Images", ISAT Symposium on Electronic Imaging Science & Technology: 2179–43, 1994.
Xerox Color Encoding Standard XNSS 289005, 1989.

Primary Examiner—Scott A. Rogers
Attorney, Agent, or Firm—Mark Costello

[57] ABSTRACT

A method and apparatus for image-dependent color saturation correction in natural scene images in electronic documents is provided, wherein an input image is converted from its original color space definition to a luminance-hue-saturation color space, such as HSV space, where S has a strong correlation to perceived saturation. That saturation component of the signal is averaged over the image for at least a region of its input value range corresponding to brightness, and the determined average is compared to a threshold selected to represent desirable saturation level. If saturation is less than target saturation, a filtering function is selected, operable on the image to enhance saturation as a function of the average saturation and desired saturations. Otherwise, no change is made to the image. Since altering saturation of an image in HSV space will tend to alter luminance of the image, subsequent to filtering the image to enhance saturation, the image is refiltered to reduce luminance as a function of the original luminance and the luminance of the saturation-enhanced image.

13 Claims, 4 Drawing Sheets

IMAGE-DEPENDENT COLOR SATURATION CORRECTION IN A NATURAL SCENE PICTORIAL IMAGE

The present invention is directed towards a method and apparatus for image-dependent color saturation correction in natural scene color electronic pictures.

CROSS REFERENCE

Cross reference is made to the following U.S. patent application Ser. Nos.: 08/132,973, filed Oct. 7, 1993, entitled "Image-Dependent Exposure Enhancement" by R. Eschbach; 08/133,231, filed Oct. 7, 1993, entitled "Image-Dependent Luminance Enhancement", by R. Eschbach et al.; 08/147,612, filed Nov. 5, 1993, entitled "Image-Dependent Sharpness Enhancement", by R. Eschbach et al.; 08/147,614, filed Nov. 5, 1993, entitled "Cascaded Image Processing Using Histogram Prediction", by W. Fuss et al.; 08/139,660, filed Oct. 22, 1993, entitled "Image-Dependent Color Correction Using Black Point and White Point in a Natural Scene Pictorial Image", by R. Eschbach.

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality. One very common set of input documents includes color photographs. Unfortunately, photography is an inexact science, particularly among amateurs, and original photographs are often poor. Alternately, technology, age or image degradation variations result in pictures having an unsatisfactory and undesirable appearance. What is desired then, is a copy giving the best possible picture, arid not a copy of the original.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

In digital image processing, three possible choices are presented by the art in the area of image enhancement. In the first case, we can do nothing. Such a system is a stable system, in that it does no harm to an image, but its output documents are sometimes not satisfactory to the ultimate customer.

In a second case of image enhancement, the image can always be processed. It turns out than an improvement can usually be made to an image if certain assumptions are made that are accurate for most cases. In an exceptionally large set of images, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further, the process may undesirably operate on those images which are good ones.

Accordingly, we arrive at our third case of image enhancement, a process of automated image enhancement which operates to vary images which are not perceived as good images, but does not operate on images which do not need to be improved, thereby allowing a stable process.

One common deficiency of images is the apparent lack of image saturation, or, interchangeably, the desire to obtain a higher image saturation. Several factors contribute to the lack of image saturation. One factor is the degradation of images due to aging or other external influences. Another factor is the mismatch between data range of the image and the possible dynamic range of the scanning system. A third factor is the discrepancy between the "memory" of an image and the "reality" of an image. A common example for this third category is the desire for images to display "blue sky" and "green grass" even if this does not accurately reproduce the colors or the colorfulness of the original scene.

One approach to correct the saturation of a color image is described by Akira Inoue and Johji Tajima in "Adaptive Quality Improvement Method for Color Images," IS&T/SPIE Symposium on Electronic Imaging Science and Technology, [2179-43], 1994. In this approach the maximum saturation in HSV (hue-saturation-value) color space is measured and a correction coefficient is calculated to adjust the maximum measured saturation Smax to be transformed into the maximum obtainable saturation Smax=1. The difficulty of this approach is that false measurements are easily obtained due to the unreliable nature of the HSV data for low V values. Secondly, relying on one single measurement makes the algorithm susceptible to image noise. Thirdly adjusting image saturation in HSV space can lead to strong image noise in the visual appearance of lightness or luminance.

The references cited herein, and the listed co-pending patent applications are herein incorporated by reference for their teachings.

SUMMARY OF THE INVENTION

In accordance with the invention, there is provided a method and apparatus for image-dependent color saturation correction in natural scene images in electronic documents.

In accordance with one aspect of the invention, a method and apparatus for image-dependent color saturation correction in natural scene images in electronic documents is provided. An input image is converted from its original color space definition to a luminance-hue-saturation color space, such as HSV space, where S has a strong correlation to perceived saturation. That saturation component of the signal is selectively averaged over the image based on the local image value V in order to reduce the influence of image noise and eliminate the dependency of the measurement of low V value data. The determined average is compared to a threshold selected to represent desirable saturation level. If saturation is less than target saturation, a filter is selected, operable on the image to enhance saturation as a function of the average saturation and desired saturation. Otherwise, no change is made to the image.

In accordance with another aspect of the invention, altering saturation of an image in HSV space will tend to alter luminance of the image. Accordingly, subsequent to filtering the image to enhance saturation, the image is refiltered to reduce luminance variations as a function of the original luminance and the luminance of the saturation-enhanced image. Alternatively, the luminance value of the saturation-enhanced image is replaced by the original luminance value. Subsequently the saturation-enhanced image is directed to an output device.

In accordance with yet another aspect of the invention, there is provided a method of image-dependent color saturation correction in natural scene images in electronic documents including the steps of: converting an original image from its original color space definition to a second color space definition having a saturation component with a strong correlation to perceived saturation; determining average saturation for at least a portion of the value range of the original image data as a function of the saturation component in the second color space definition thereof; comparing determined average saturation to a target saturation selected to represent a desirable saturation, and generating a comparison signal indicating whether determined average saturation is less than target saturation; if the comparison signal indicates average saturation is less than target saturation, generating filter coefficients as a function of average saturation and desired saturation; directing the original image defined in terms of the second color space to a programmable filter operating on the saturation component thereof with the generated filter coefficients, to produce a saturation-modified image; directing the saturation-modified image to an output device; if the comparison signal indicates average saturation is less than target saturation, directing the image to an output device without modification to the saturation component.

The current invention describes a method that has a reduced sensitivity to image noise, low sensitivity to low V value data and the ability to maintain local luminance, thereby eliminating major image noise sources.

These and other aspects of the invention will become apparent from the following descriptions used to illustrate the preferred embodiment of the invention, read in conjunction with the accompanying drawings in which:

FIG. 1 shows an overall system block diagram, illustrating a system in which the present invention may find use;

FIGS. 2A and 2B compare saturation curves in HSV space for a saturated image and an unsaturated image, respectively;

FIG. 3 shows a block diagram of a saturation modification system accomplishing the present invention; and FIG. 4 shows a luminance correction system in accordance with another aspect of the present invention.

DETAILED DESCRIPTION OF THE INVENTION

Figure 1:
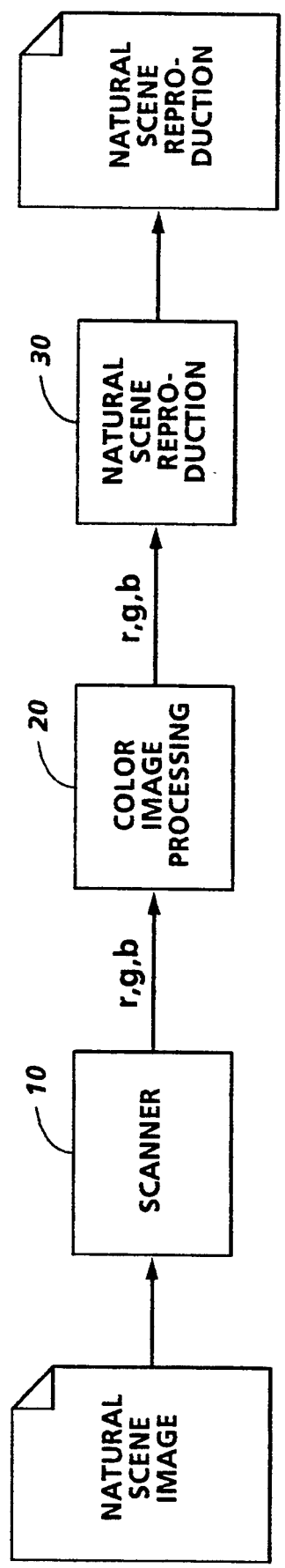

Referring now to the drawings where the showings are for the purpose of describing the embodiment of the invention and not for limiting same, reference is made to the FIG. 1 scan-to-print system in which the present invention may find advantageous use.

FIG. 1 illustrates a scanner 10 which may conveniently be a color scanner which produces image signals defined in either rgb space for color images. These images of concern are pictorial in nature, i.e., they represent natural scenes. While certain computer generated imagery may qualify as representing nature scenes, the contemplated images are predominantly scanned photographs. The images themselves are defined in terms of pixels, wherein each pixel has a triplet of three gray values which vary between a white level and a black level. In a currently desirable system, in which calculations may be done on 8 bits of information, 256 levels for each separation will be available for use, Pixels are also identified in terms of position, i.e., a pixel defines a unique area within the image, identified by its position in a scan line, and the scan line position in a page. Color is therefore represented by triplets of pixel values for each color pixel in the image, each member of the triplet of pixel values defining the color in each separation, which together form the color pixel.

Scanner 10 represents a device, which may include a slide scanner, a document scanner, an electronic camera etc., for reducing a visible image to electronic signals. The electronic signals produced by the scanner 10 are commonly given in terms of a standard CIE color space defined in terms of red, green and blue (rgb) colored lights, or alternatively, are correctable to such terms. These signals (i.e., pixels) are edited, enhanced and prepared for printing at color image processing unit 20, which provides as an output signals in rgb space or the like. Printer 30 receives the signal from color image processing unit 20, and provides for conversion of the signals to printer driver signals, commonly given in terms of the colorants that will be used in reproduction, typically Cyan, Magenta, Yellow and Key or black (CMYK). The printer has as an output the natural scene image, which, hopefully, closely resembles the scene as desired by the user. Alternatively, the processed image from color image processing unit 20 is displayed on a television screen, CRT display or the like.

The output of a scanner 10 may be directed to a color image processing unit 20 including an automated image enhancement system which will be further defined herein. For our purposes, the automated image enhancement system may include a segmentation system which can identify within a document a type of image, including pictorial and nonpictorial image areas. It will be assumed that the output of the automated image enhancement system that is described herein will be directed to a printer, CRT, or like device. These devices may have many characteristics and may be laser printers, or ink jet printers or LCD displays or CRT displays.

In terms of deriving data for operation by the present image enhancement system, a prescan may optionally be performed on a document placed on a copying or scanning platen and scanned by the electro-optical system of the scanner to produce a signal representing the document image. Alternatively, the image may be directed to the automated image enhancement system from a memory, having previously been scanned or derived some other system, in which case, the received image is sampled as required.

The prescan may be performed in an undersampled fashion, i.e., the image need not be sampled at the ultimate resolution of the system for the purposes of enhancement. In practice, it has been determined that a relatively small number of pixels representative of and dispersed through the entire image can accurately represent the image for this purpose. In our particular embodiment, we use a block of pixels derived from the image in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Hardware embodiments of the described inventive process might be designed not to undersample the image.

Initially, the principle of the invention will be discussed. An image is transformed into a luminance-hue-saturation color space. One such space is the HSV (Hue-Saturation-Value) model described in the Xerox Color Encoding Standard XNSS 289005, 1989 (See, Appendix C.7), wherein the saturation component of the model provides a strong correlation between human perception of saturation and the saturation component of the model. While the model provides a non-linear relationship with standard rgb color spaces, it also has the property that saturation ranges between 0 and 1 for all values V. It is useful to note that in another color space with a saturation variable, YHS space, saturation is a function of luminance Y and hue H. This is quite distinct from the described HSV space.

Figure 2A:
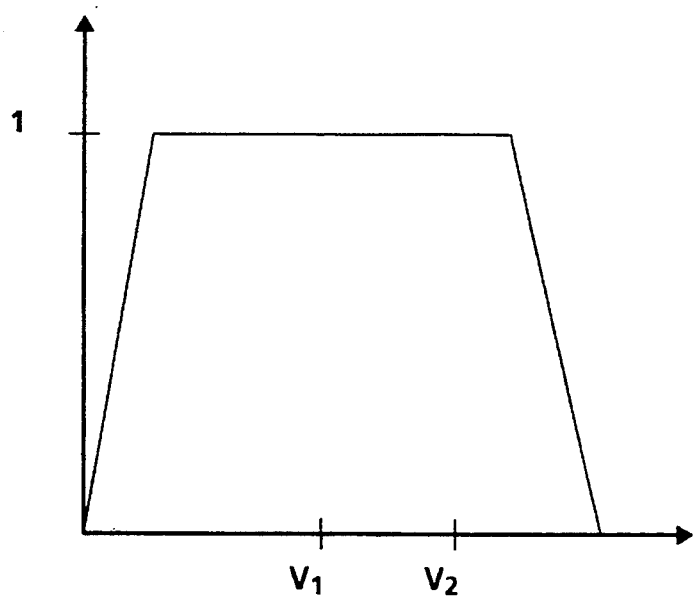
Figure 2B:
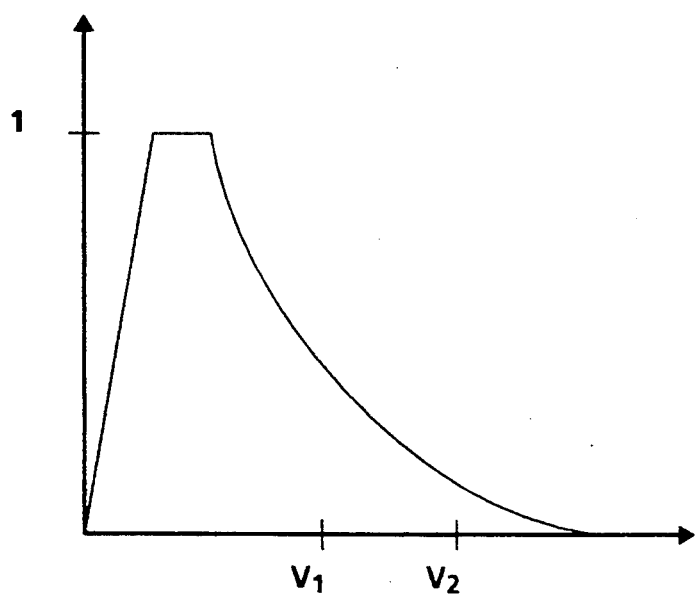

With reference now to FIGS. 2A and 2B, a comparison of a well saturated image (FIG. 2A) to a poorly saturated image (FIG. 2B) is illustrated. To be noted is that the unsaturated image is characterized by low saturation over a range of values of V, while the well saturated image has high saturation levels for a broad range of V.

Based on observations, it is noted that perceived saturation of an image is an average of the maximum saturation function over the range of value V. Alternatively stated, $$S_{av} = \frac{1}{(v_2 - v_1)} \int_{v_1}^{v_2} S(V) dV$$

The evaluated average saturation $S_{av}$ is compared to a fixed target $S_{target}$ (indicating desired saturation), to determine if image saturation should be enhanced. Saturation boost or increase B is defined as:

$B = S_{av}/S_{target}$, if $S_{av} < S_{target}$, $B = 1$, otherwise

This decision prevents saturation from being boosted or increased in a well saturated image.

It will be recognized that saturation in HSV space is measured in a color space that correlates well with the human perception of saturation, but, that the value (V) component of that color space does not correlate well with the perception of brightness. A simple example can be found considering a saturated yellow and a saturated blue. In both cases S of HSV is "1" because the colors are fully saturated. However, in both cases V is also identical. It is well established that a saturated yellow is much brighter than a saturated blue which shows the deficiency of the HSV system to represent image brightness through the V component. The HSV model of color space, does not describe luminance satisfactorily, as the V term is not a function solely of luminance, as are, for example Y (of YES space) or L* (of L*A*B* space). Any changes to the image along constant V therefore can change the luminance of the image. Modification of the saturation component of the HSV model would be such a modification. As an example, consider the following change in saturation of an image defined in HSV terms and the result of the change in terms of Y (luminance):

$(r,g,b) = (255, 254, 253) \rightarrow (H,S,V) = (30, 0.008, 255)$
$Y = 254.2$ changing S to 1 gives $(r,g,b) = (255, 127.5, 0) \rightarrow (H,S,V) = (30, 1, 255)$
$Y = 151.7$ As may be seen by this example, the image resulting from saturation modification has a dramatic change in luminance, which in our application is often perceived as image noise. By observation it was found that a subjectively higher image quality may be obtained by forcing the luminance of the output pixels to be equal to the luminance of the input pixel, in addition to correcting saturation in HSV space. To achieve this, luminance for each input pixel is calculated, and output luminance is adjusted to this value. This is done by simply calculating luminance (Y) after HSV saturation modification and introducing factor k as $k = Y/Y'$, which is applied to the image by $r_{FINAL} = k \times r'$ $g_{FINAL} = k \times g'$ $b_{FINAL} = k \times b'$ Where $(r,g,b)_{FINAL}$ is the desired luminance corrected-output value, and $(r,g,b)'$ is the r,g,b space value determined for the pixel after HSV saturation modifications. Alternatively, the luminance of the saturation modified image may be simply be replaced with the luminance of the original image.

Figure 3:
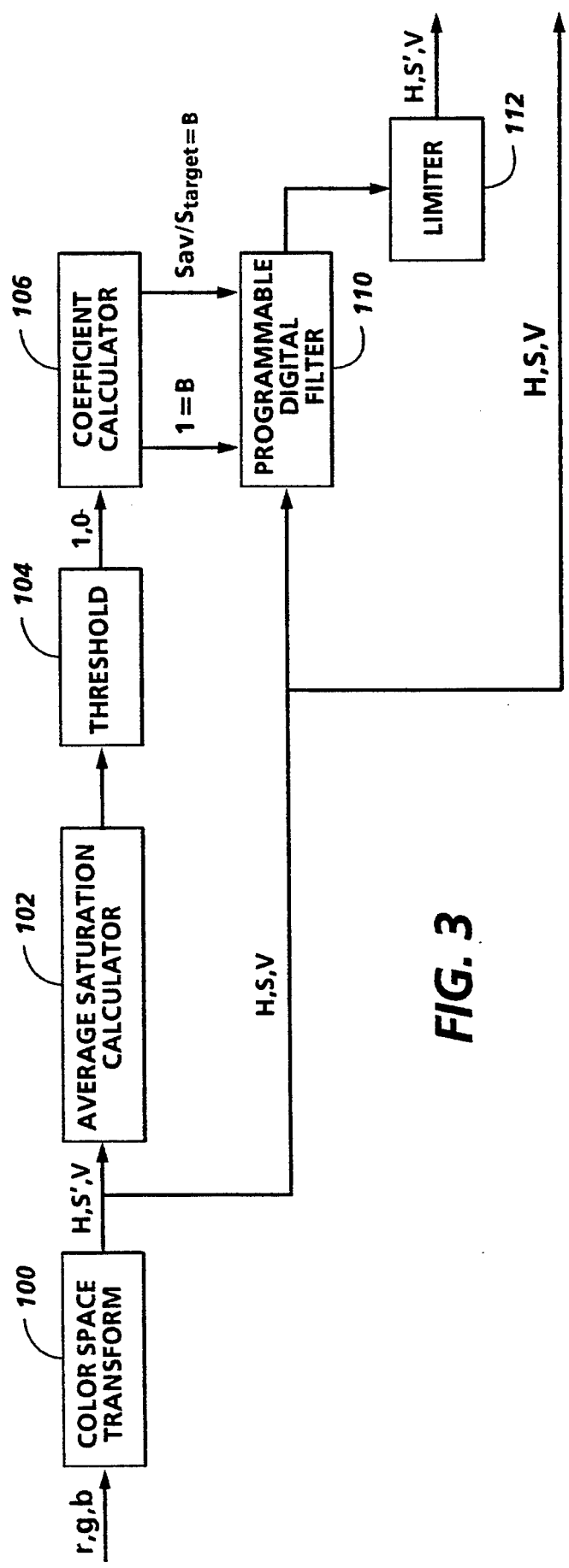

FIG. 3 shows a block diagram of a system incorporating the present invention. At color space transformer 100, which can be a special purpose calculating circuit or unit, a preprogrammed microprocessor, or the like, values expressed terms of a color space other than HSV are transformed to HSV space. Typically, image descriptions are received in terms of red-green-blue signals, although, as described in the several cross referenced patent applications, the image may alternatively be in $LC_1C_2$ space for other reasons.

Initially, average saturation is determined from the image at average saturation calculation 102, which can be a special purpose calculating circuit or unit or a preprogrammed microprocessor, or the like, returning the average saturation calculation 102 is a value of $S_{av}$. Next, at thresholder 104 the value of $S_{av}$ is thresholded against the value of $S_{target}$, received from an external source, perhaps entered from a UI in accordance with user preference. Based on the thresholder comparison, a binary 1 or 0 is returned to drive coefficient calculation 106 to output either $S_{av}/S_{target}$, if $S_{av} < S_{target}$ or 1 to programmable digital filter 110, which operates on received values from color space transform 100 to enhance saturation of the overall image. If no saturation modification is to occur, the filter does not vary the signal. The illustrated arrangement shows that the signal to be processed is always processed by programmable digital filter 110. However, it is well within the invention to provide an arrangement in which the signal to be processed is routed around the programmable filter in the case that no saturation enhancement will occur. Such alternative circuit path is controllable in the same sequence as provided above.

At limiter 112, the filtered saturation signal is limited to the range of 0 to 1. Since the permitted range of S in the HSV model is between 0 and 1 for all hues and values, this saturation enhancement does not cause gamut mismatch. A signal H, S', V results.

Figure 4:
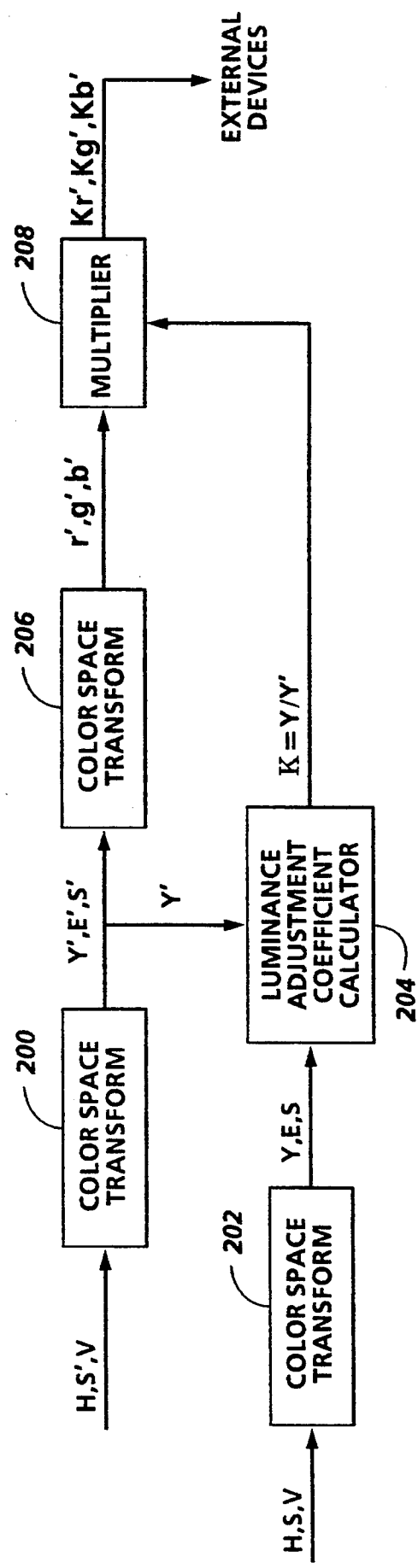

With reference now to FIG. 4, as discussed above, the luminance of the image must be corrected. Accordingly, at color space transform 200, which can be a special purpose calculating circuit or unit or a preprogrammed microprocessor, or the like, signal H, S', V is converted first to YES space, to produce signal Y', E', S'. Subsequently, signal Y', E', S' is directed to yet another color space transform 206, which can be a special purpose calculating circuit or unit or a preprogrammed microprocessor, or the like, for conversion to output rgb space, where the signals r', g', b' result. Similarly, uncorrected signal H, S, V resulting from the earlier color space transform (color space transform 100, FIG. 3) is converted to YES space at color space transform 202, which can be a special purpose calculating circuit or unit or a preprogrammed microprocessor, or the like, to produce signals Y, E, S. It will no doubt be appreciated that these are identical transforms which could be accomplished by the same device. At luminance adjustment coefficient calculator 204, which can be a special purpose calculating circuit or unit or a preprogrammed microprocessor, a value of k is calculated as a function of the original Y and the saturation modified Y. Value k is transmitted to multiplier 208, where output r, g, b values are produces by multiplying signal r', g', b' by k.

Alternatively the luminance adjustment might be performed by replacing the luminance component Y' of color space transformer 200 by the luminance component Y of color space transformer 202, by directing the signal Y, E', S' to color space transformer 206.

It will no doubt be appreciated that the present invention can be accomplished through application software accomplishing the functions though a hardware circuit, which will probably provide optimum speed, or through some combination of software and hardware.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of image-dependent color saturation correction in natural scene images in electronic documents including the steps of:

converting an original image from its original color space definition to a second color space definition having a saturation component with a strong correlation to perceived saturation;

determining average saturation for at least a portion of the value range of the original image data as a function of the saturation component in the second color space definition thereof;

comparing determined average saturation to a target saturation selected to represent a desirable saturation, and generating a comparison signal indicating whether determined average saturation is less than target saturation;

if the comparison signal indicates average saturation is less than target saturation, generating filter coefficients as a function of average saturation and desired saturation;

directing the original image defined in terms of the second color space to a programmable filter operating on the saturation component thereof with the generated filter coefficients, to produce a saturation-modified image;

directing the saturation-modified image to an output device;

if the comparison signal indicates average saturation is greater than target saturation, directing the image to an output device without modification to the saturation component.

2. The method as defined in claim 1, and including the additional step of limiting the saturation component to a maximum value.

3. The method as defined in claim 1, and including the additional steps preparatory to directing the saturation-modified image to an output device:

converting the original image from its original color space definition to a third color space definition including a component with a strong correlation to luminance;

converting the saturation-modified image from the second color space to the third color space;

adjusting the luminance component of the saturation modified image as a function of the luminance component of the original image.

4. The method as defined in claim 3, wherein the luminance component of the saturation-modified image is adjusted by replacing the luminance component thereof with the luminance component of the original image.

5. The method as defined in claim 3, where the luminance component of the saturation-modified image is adjusted by deriving a multiplier as a function of the original image luminance component and the saturation modified image luminance component; and using the derived multiplier to correct the saturation-modified image.

6. The method as defined in claim 5, and including the additional step of converting the saturation-modified image from the second color space to a fourth color space defined in terms of red-green-blue subtractive color, prior to using the derived multiplier to correct the saturation-modified image.

7. An image processor for image-dependent color saturation correction in natural scene images in electronic documents comprising:

an input receiving a color image defined in terms of an original color space;

a first color space converter operatively connected to said input and producing as an output the image defined in terms of a second color space definition having a saturation component with a strong correlation to perceived saturation;

means for measuring the average saturation for at least a portion of the input dynamic range of the original image as a function of the saturation component in the second color space definition thereof;

a comparator, operatively connected to said average saturation measuring means and producing a response signal indicating whether determined average saturation is less than target saturation;

a coefficient calculating circuit, operative in response to the first signal to generate filter coefficients as a function of average saturation and desired saturation;

a programmable filter receiving the image from the color space transform and operating on the saturation component thereof with the filter coefficients, to produce a saturation-modified image;

an output directing the saturation-modified image from the programmable filter to an output device.

8. A device as defined in claim 7, wherein said coefficient calculating circuit is operative in response to a second signal indicating that determined average saturation is greater than target saturation to generate filter coefficients that will allow the original image to pass through the programmed filter without saturation modification.

9. The device as defined in claim 7, and including a limiter which prevents the saturation component from exceeding a maximum value.

10. The device as defined in claim 7, further comprising:

a second color space converter, operatively connected to said first color space converter and converting the image from its original color space definition to a third color space definition including a component with a strong correlation to luminance;

a third color space converter, operatively connected to said programmable filter, and converting the saturation-modified image from the second color space to the third color space;

a luminance adjustment circuit having as inputs the luminance component describing the saturation-modified image and the luminance component of the saturation-modified image, and producing as an output a luminance adjusted and saturated modified image.

11. The method as defined in claim 10, and including the additional step of converting the saturation-modified image from the second color space to a fourth color space defined in terms of red-green-blue subtractive color, prior to using the derived multiplier to correct the saturation-modified image.

12. The method as defined in claim 10, where the luminance component is adjusted by replacing the luminance component of the saturation modified image with the luminance component of the original image.

13. The method as defined in claim 9, where the luminance component is adjusted by deriving a multiplier as a function of the original image luminance component and the saturation modified image luminance component; and using the derived multiplier to correct the saturation-modified image.

* * * * *